(12) United States Patent
Jamkhedkar et al.

(10) Patent No.: US 12,333,519 B2
(45) Date of Patent: *Jun. 17, 2025

(54) SECURE QR CODE BASED DATA TRANSFERS

(71) Applicant: PAYPAL, INC., San Jose, CA (US)

(72) Inventors: Prashant Jamkhedkar, Fremont, CA (US); Patrick Babcock, Sturbridge, MA (US); Anant Ganapathy, Cupertino, CA (US); Haoyu Xue, San Jose, CA (US); Jie Leng, San Jose, CA (US); Amarnath Kulkarni, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,468

(22) Filed: Nov. 28, 2023

(65) Prior Publication Data

US 2024/0104547 A1 Mar. 28, 2024

Related U.S. Application Data

(63) Continuation of application No. 17/515,469, filed on Oct. 31, 2021, now Pat. No. 11,893,569, which is a
(Continued)

(51) Int. Cl.
*G06Q 20/32* (2012.01)
*G06K 7/14* (2006.01)
(Continued)

(52) U.S. Cl.
CPC ....... *G06Q 20/3274* (2013.01); *G06K 7/1417* (2013.01); *G06K 19/06037* (2013.01); *G06Q 20/382* (2013.01)

(58) Field of Classification Search
None
See application file for complete search history.

(56) References Cited

U.S. PATENT DOCUMENTS 9,256,769 B1 * 2/2016 Lamfalusi ............... G06K 7/01
9,904,934 B1 * 2/2018 Kumar ............... G06Q 30/0238
(Continued)

FOREIGN PATENT DOCUMENTS

CN 104737189 A 6/2015
CN 105122282 A 12/2015
(Continued)

OTHER PUBLICATIONS

"Feng Zhang, Location-based authentication and authorization using smart phone", School of Information and Communication Technology Royal Institute of Technology (KTH), Stockholm, Sweden (Year: 2012).*

(Continued)

*Primary Examiner* — Christopher Bridges
*Assistant Examiner* — Toan Duc Bui

(57) ABSTRACT

According to an aspect of an embodiment of the present disclosure, a method may include receiving a quick response (QR) code from a computing device, the QR code including a first entity identifier, and analyzing the QR code to determine a request to initiate a data transfer between a first entity associated with the first entity identifier and a second entity, and to determine one or more characteristics associated with the data transfer. The method may also include, based on the one or more characteristics, identifying a first QR code processing flow from multiple QR code processing flows to follow to process the data transfer, and verifying the first entity in the transaction based on the first entity identifier of the QR code and based on the first QR code processing flow. The method may also include processing
(Continued)

the data transfer between the second entity and the first entity based on the first QR code processing flow.

20 Claims, 8 Drawing Sheets

Related U.S. Application Data continuation of application No. 15/859,045, filed on Dec. 29, 2017, now Pat. No. 11,238,433.

(51) Int. Cl.
*G06K 19/06* (2006.01)
*G06Q 20/38* (2012.01)

(56) References Cited

U.S. PATENT DOCUMENTS

| | | | |
|---|---|---|---|
| 11,727,347 B2* | 8/2023 | McCrery | G06Q 10/0833 705/339 |
| 2012/0160912 A1 | 6/2012 | Laracey | |
| 2014/0279554 A1 | 9/2014 | Priebatsch et al. | |
| 2015/0066765 A1 | 3/2015 | Banks et al. | |
| 2015/0127547 A1* | 5/2015 | Powell | G06Q 20/382 705/67 |
| 2015/0178721 A1 | 6/2015 | Pandiarajan et al. | |
| 2016/0132891 A1 | 5/2016 | MacKinnon Keith | |
| 2016/0239655 A1 | 8/2016 | Sadacharam et al. | |
| 2016/0253653 A1 | 9/2016 | Jacob et al. | |
| 2016/0292737 A1* | 10/2016 | Barnes, Jr. | G06Q 20/322 |
| 2018/0144337 A1 | 5/2018 | Maniar et al. | |
| 2018/0173906 A1 | 6/2018 | Rodriguez et al. | |
| 2018/0225656 A1* | 8/2018 | Ray | G06Q 20/3227 |
| 2019/0066089 A1* | 2/2019 | Miryala | G06Q 20/367 |
| 2019/0095886 A1 | 3/2019 | Tran et al. | |
| 2019/0108582 A1 | 4/2019 | Sebastian et al. | |
| 2023/0259999 A1* | 8/2023 | Edler | H04N 21/6581 705/26.61 |

FOREIGN PATENT DOCUMENTS

| | | |
|---|---|---|
| CN | 105531733 A | 4/2016 |
| CN | 107077664 A | 8/2017 |
| EP | 2509275 A1 | 10/2012 |

OTHER PUBLICATIONS

Extended European Search Report for European Application No. 18897514.8 mailed on Aug. 27, 2021, 7 pages.
International Appl. No. PCT/US2018/067613, International Search Report and Written Opinion mailed Apr. 2, 2019, 10 pages.
International Preliminary Report on Patentability for Application No. PCT/US2018/067613 mailed on Jul. 9, 2020, 10 pages.
Pujar J.S., "Mobile Payment System Using QR Code," IJRAR, Feb. 2015, vol. 2, No. 2, pp. 38-40.

* cited by examiner

SECURE QR CODE BASED DATA TRANSFERS

CROSS REFERENCE TO RELATED APPLICATIONS

This application is a Continuation of U.S. patent application Ser. No. 17/515,469, filed Oct. 31, 2021, which is a Continuation of U.S. patent application Ser. No. 15/859,045, filed Dec. 29, 2017, now U.S. Pat. No. 11,238,433, which are incorporated by reference in their entirety.

FIELD

Embodiments of the present disclosure relate to quick response (QR) codes and their uses in a variety of secured data transfers.

BACKGROUND

Mobile devices have become a common device for individuals to carry with them.

Many mobile devices have a camera or other optical scanning device. Because of the prevalence of such mobile devices, some entities have begun to use QR codes to convey information. A QR code may include a matrix barcode as a machine-readable optical label that carries information in the label. The information may be encrypted or otherwise secured.

BRIEF DESCRIPTION OF THE DRAWINGS

Example embodiments will be described and explained with additional specificity and detail through the use of the accompanying drawings in which.

DETAILED DESCRIPTION

Figure 1:
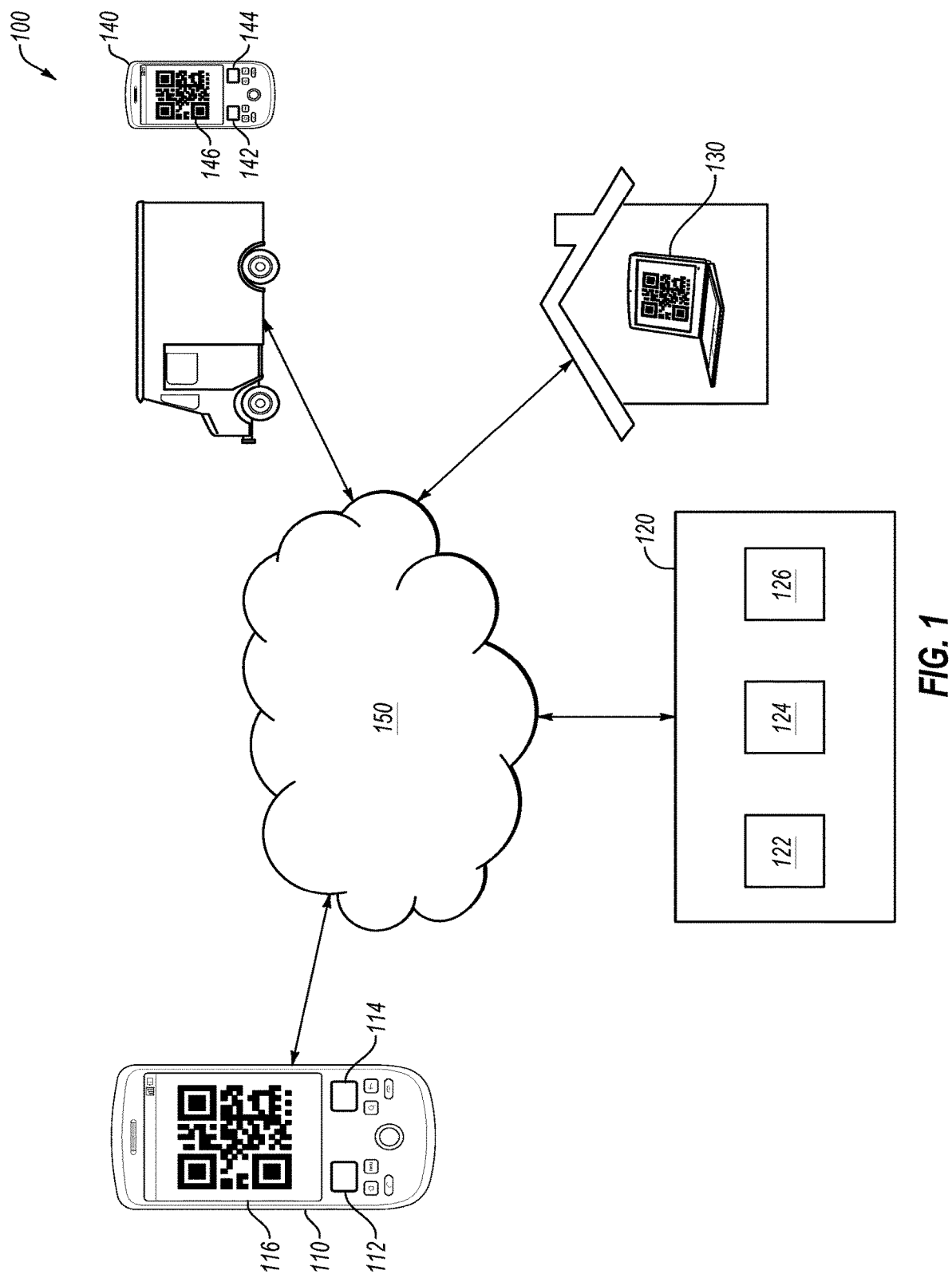
FIG. 1 is a diagram illustrating an example system that may implement QR code based data transfers.

There are multiple potential ways to process data transfers using QR codes. However, different flows of processing such data transfers may be undesirable in certain circumstances, and even completely unworkable in others. Additionally, the infrastructure that may be used to process such a data transfer is typically only able to handle a single flow of a data transfer using QR codes. Furthermore, an entity desiring to participate in QR code based data transfers may not be aware of which flows are beneficial in which circumstances, and may end up utilizing multiple different sets of infrastructure to handle the different flows. Having a system that facilitates multiple potential flows for QR code based data transfers may cause problems in that a party may not know which flow to use, and even when a flow is selected, the system would need to distinguish between the flows and process the transfer correctly. Furthermore, security for such data transfers may be an important consideration (e.g., if the data transfer is associated with a financial transaction).

The present disclosure may provide a system that addresses these problems by assisting a first entity (e.g., a merchant) in determining which of a plurality of QR code based data transfer flows may be advantageous or appropriate for the first entity (e.g., merchant). Additionally, after selecting a flow via which the first entity (e.g., merchant) handles QR code based data transfers, the present disclosure addresses the problem of distinguishing between which flow to use for which entity such that a single system may be configured to handle multiple different QR code based flows from multiple different entities.

One or more embodiments of the present disclosure relate to an infrastructure usable to provide multiple potential options for the use of QR codes in data transfers. For example, a system may be provided via which a merchant may register with the system and during the registration, select one of multiple potential options for processing data transfers (e.g., transactions) using QR codes. Before presenting the potential options to the merchant, the system may limit which options are presented to the merchant. For example, based on information provided by the first entity in a registration process, the system may omit certain flows depending on if the first entity is a mobile merchant (e.g., a food truck) or whether the first entity operates from a brick-and-mortar store. As another example, the system may omit certain flows depending on the geographic region or the market in which the first entity operates. In some embodiments, the system may pose a set of inquiries to the first party (e.g., a merchant) to facilitate a determination of which flows to present to the first party as options, such as the address of the first party, the market in which the first party operates (e.g., clothing retailer vs. jewelry retailer), a physical location of the first party, a number of branches of the first party, a risk tolerance for the first party, etc. In some embodiments, the system may provide a recommendation of a particular flow to the first party for selection.

In some embodiments, in providing a recommendation (or in selecting a flow by the first entity), a variety of other factors may also be considered, such as whether the QR code is unique for each data transfer (a dynamic QR code), or entity-specific but used for multiple data transfers (a static QR code), which may affect the amount of network communication utilized for each data transfer. Another factor may include whether the QR code is generated by the first entity (e.g., a merchant) and scanned by second entity (e.g., a consumer) or generated by the second entity and scanned by the first entity, which may affect the security of the transaction and whether or not certain parties require certain device capabilities. Another factor (e.g., when the data transfer involves a transaction) may include whether the QR code includes an amount associated with the transaction or whether one of the parties to the transaction provides the amount of a payment for the transaction during the transaction, which may affect the security of the transaction and/or the amount of network communication utilized. Other factors related to the entity (e.g., the merchant) or the region of the world within which the entity operates may affect which of the flows is selected. For example, one or more options may be removed before the first entity is presented with potential QR code flows from which the first entity selects based on the amount of network usage utilized during data transfers, the security of the data transfer, the mobility of the merchant, etc. Another factor may include whether or not the first entity (e.g., the merchant) has access to specialized hardware and/or software for generating, scanning, and/or displaying certain classes or security features of QR codes. The present disclosure may additionally relate to the use of such a flow to process transactions using QR codes.

Various embodiments of the present disclosure may improve the operation of a computer and may improve the related technology of computer security and network communication. For example, the present disclosure improves the operation of a computer by providing a single system that can facilitate multiple flows of QR code based data transfers, rather than utilizing multiple distinct computing devices. As another example, computer security and network communications are improved as a particular flow of data transfers processing using QR codes may be tailored to a particular risk profile of a region or market. Additionally, the flow may be selected to accommodate the network bandwidth infrastructure within which the system may be operating. For example, the system may intelligently limit which flows a first entity (e.g., a merchant) may select based on the network bandwidth infrastructure of the region in which the first entity operates. In this manner, rather than forcing the infrastructure to bear the load of increased network traffic, a flow with an appropriate amount of traffic for the region may be selected. Additionally, a type or style of QR code may be generated dynamically based on the network infrastructure and/or performance. In such embodiments, the present disclosure may avoid the first entity placing extensive or heavy burdens on an already-taxed network system. Rather, the present disclosure may intelligently and securely provide a more tailored amount of network load to facilitate a secure and rapid data transfer.

Various embodiments of the present disclosure may additionally operate in a manner such that, even if implemented using typical components, cause those components to operate in a non-traditional manner. For example, the various flows may utilize the generation of QR codes and the response to scanning of QR codes to operate in a manner different from that observed in traditional uses of QR codes.

One or more example embodiments are explained with reference to the accompanying drawings.

FIG. 1 is a diagram illustrating an example system 100 that may implement QR code based data transfers, in accordance with one or more embodiments of the present disclosure. As detailed below, the system 100 may include a second entity device 110, a support server 120, an example first entity device 130 and another example first entity device 140, and a network 150. The first entity and the second entity may engage in a QR code based data transfer supported by the support server 120 using the second entity device 110 and the first entity devices 130/140. One of the second entity device 110 or the first entity device 130/140 may generate a QR code and the other may scan the QR code to facilitate the data transfer.

In some embodiments, the data transfer may include a transaction between a consumer and a merchant. For example, a consumer and/or a merchant may transfer data associated with a transaction to verify a party, an amount of the transaction, etc. via the use of QR codes.

In some embodiments, prior to engaging in QR based data transfers, a first entity (such as a merchant that uses one or both of the first entity devices 130 or 140) may interact with the support server 120 to register to perform QR code based data transfers. In registering, the support server 120 may identify information regarding the first entity and propose one or more potential flows for processing QR code based data transfers to the first entity via the first entity device 130 or 140. For example, in some embodiments, the support server 120 (or an application operating on the first entity device 130/140) may pose a series of questions to the first entity when registering to obtain the information. Such information may include a name of the first entity, an address of the first entity (including addresses for multiple branches/locations of the first entity), a size of the first entity (e.g., number of employees, amount of revenue, etc.), a market in which the first entity operates, computing infrastructure for the first entity, network connection for the first entity, a risk tolerance for the first entity, preferences for the first entity, etc. In response to the information, the support server 120 may provide a recommendation or may provide multiple potential data transfer flows from which the first entity may select for the first entity to use when processing QR code based transfers. Examples of such flows may be depicted in FIGS. 2-7.

In some embodiments, to determine the network infrastructure of the first entity, the support server 120 may determine properties of communications with the first entity (e.g., via ping or other network testing communication). In these and other embodiments, the network infrastructure may be determined in real-time as the first entity registers with the support server.

In some embodiments, the support server 120 may determine properties of the network infrastructure at the time of a data transfer (e.g., a transaction). Based on a low network performance or low network availability, the support server 120 may facilitate the use of a less-complex QR code that may utilize a lower amount of network resources during the data transfer. In some embodiments, the less-complex QR code may be different from a QR code typically used in a data-transfer under typical (e.g., high network availability) circumstances. Additionally or alternatively, one or more security features (e.g., a pairing operation or a handshake between electronic devices) may be omitted to preserve network band width.

In some embodiments, the various flows may be distinguished be a variety of factors, such as whether the first entity or second entity generates the QR code, whether the QR code is static or dynamic, and/or whether the amount is entered by the second entity or the first entity. Additionally, the flows may be distinguished by a risk profile of the industry in which the first entity practices (e.g., grocer vs. jewelry store), a risk profile of the geographic location in which the first entity operates (e.g., a low crime country or region vs. a high crime country or region region), a network infrastructure of the geographic location in which the first entity operates (e.g., whether Internet speeds above a threshold amount are generally available or whether low speed Internet is generally available). In some embodiments, these factors may contribute to the recommendation or list of potential flows presented to the first entity for selection. For example, if the first entity operates in a country or region with limited network infrastructure, the support server 120 may present the first entity with a limited set of flows that excludes flows that utilize a large amount of network data.

In some embodiments, some flows may be better suited to one type of first entity or type of region than another. For example, the flows illustrated in FIGS. 3 and 5 may be particularly beneficial for small merchants as such small merchants may not have the computing infrastructure in place to accommodate the other flows. However, such flows may still allow smaller merchants to participate in QR code based transactions. As another example, the flows illustrated in FIGS. 6 and 7 may be particularly beneficial for large first entities that can leverage more robust computing infrastructure and provide a more secure data transfer. Based on such factors, the support server 120 may select certain flows to be presented to the first entity for selection.

After selecting a flow that will be used, the support server 120 may complete any other tasks such that the first entity is prepared to participate in QR code based data transfers. For example, if the QR code is a static QR code (e.g., the same across multiple data transfers), the support server 120 may generate the QR code and provide the QR code to the first entity. As another example, information regarding the first entity, the location(s) of the first entity, and/or information regarding the QR code (e.g., standard and version of standard used in generating the QR code, hash version used to encode the QR code, security measured used, etc.) may be stored by the support server 120 for reference, such as for validation of the first entity or for processing QR code based data transfers. After any other initialization tasks are completed, the support server 120 may be prepared to facilitate QR code based data transfers for the first entity.

In these and other embodiments, in the initial registration, the first entity and/or the support server 120 may generate various pieces of information regarding the first entity and/or the processing flow selected by the first entity. In some embodiments, a first entity identifier (e.g., a merchant identifier) may be generated that is unique to the first entity. A location of the first entity may also be generated and/or stored. In some embodiments, such a location may be determined based on the location services module 126 determining a location of the first entity device 130/140 used in registering for QR code based data transfers. In these and other embodiments, a location identifier may be generated as associated with the first entity. In some embodiments, a latitude and longitude of the first entity may be stored in addition to and/or in place of the location identifier of the first entity. Other identifying information of the first entity may also be stored, such as a telephone number. In some embodiments, characteristics may also be stored for the first entity, such as whether or not the processing flow selected utilizes pairing, which parties to the data transfer are selected to scan the QR code or generate the QR code, which parties to the data transfer are to enter an amount of the data transfer, which parties to the data transfer are to approve the data transfer, etc. Additionally or alternatively, characteristics such as notification details from a user interface or a device perspective may be stored. For example, a first entity may configure the processing flow to integrate with a pre-existing data transfer procedure for the first entity. The location of computing device to facilitate that pre-existing data transfer procedure and/or URLs or URIs of resources for implementing the pre-existing data transfer procedure may be stored (such as API endpoints). Such registrations processes may be undertaken regardless of the flow the first entity ultimately selects. Some selected flows may include additional registrations tasks (e.g., the generation of a static QR code).

In some embodiments, a QR code identifier may be generated for a static QR code and stored as associated with the QR code for the first entity. The QR code identifier may be based on the first entity identifier, the location identifier, and/or other characteristics as stored relative to the first entity. In some embodiments, the QR code may include a hashing, appending, or other combination of the first entity identifier and the location identifier. In these and other embodiments, the QR code identifier may be utilized in verifying the first entity and/or in detecting which of the flows to follow. For example, the support server 120 may receive the QR code identifier and may obtain the first entity identifier from the QR code identifier. The support server may look up the first entity from the first entity identifier and determine which flow the first entity selected in initial registration, and based on detecting which flow was selected, proceeding to process the data transfer based on the detected flow.

In some embodiments such a QR code identifier may be generated for dynamic QR codes for the first entity. In these and other embodiments, the QR code identifier may be the same across each of the dynamic QR codes. Additionally or alternatively, the QR code identifier may include a version or numerical identifier of the particular QR code among the multiple dynamically generated QR codes that may be included such that the first entity identifier and/or the location identifier portions of the QR code identifier may stay consistent but the numerical identifier may vary such that the QR code identifier may vary. In these and other embodiments, the QR code identifier may still be used to identify which of the flows the first entity has selected based on obtaining the merchant identifier from the QR code identifier.

In some embodiments, after selecting a given flow for processing QR code based data transfers and performing any other initialization tasks associated with such a flow, the system 100 may distinguish which flow is to be utilized for a given data transfer when receiving a QR code (or data derived therefrom) in supporting a QR code based data transfer. For example, one of a first entity or a second entity may scan a QR code (depending on the flow) and may either verify the QR code at the second entity device 110 or the first entity device 130/140, or may transmit the QR code to the support server 120 for verification. After receiving the QR code, or a message that a QR code has been verified, the support server 120 may analyze information embedded in the QR code or information provided in the verification message to determine which of the multiple flows a given data transfer follows. For example, a QR code may or may not have an amount of the data transfer, a location of where the QR code was generated, an identifier of what entity generated the QR code (e.g., the second entity or the first entity), etc. Such information may be extracted from the QR code by the support server 120 or may be transmitted to the support server 120 from the QR code scanning device. Based on such information, the support server 120 may identify which of the multiple flows the data transfer is to follow, and may process the data transfer accordingly. In some embodiments, the support server 120 may verify that the information identifying the flow for the data transfer is consistent with the flow selected by the first entity during registration. In some embodiments, a merchant point of sale (POS) terminal may be configured to scan and decrypt/extract information from the QR code to identify the selected flow and process the data transfer.

Various features of the QR codes generated and/or used in QR code based data transfers of the present disclosure may be utilized in identifying the flow for the data transfer and/or in maintaining security of data transfers. In some embodiments, the QR codes of the present disclosure may be provided with an expiration date. For example, a first entity (and/or the support server 120) may impose an expiration date on a QR code such that the QR code is ineffective after a certain period of time. For static QR codes, the expiration date may be days, weeks, months, or years. For dynamic QR codes, the expiration date may be minutes or hours. In some embodiments, certain regions or markets may have a shorter or longer expiration duration based on the security of the region or market. For example, in regions or countries of high crime, the expiration date may be shorter as compared to regions or countries with lower crime rates. As another example, for a merchant who works in a market with high incidence of fraud, the expiration date may be shorter.

In some embodiments, the QR code may be limited to a geographic location to enhance security of data transfers. For example, a QR code may include information regarding the location of a first entity and may trigger as invalid if scanned away from the location of the first entity. As another example, a pattern of geographic locations may be measured for a given mobile first entity and the use of a QR code outside of the measured pattern may trigger as invalid.

In some embodiments, a QR code identifier may be logically coupled with a location identifier to enhance security of data transfers. For example, for a static QR code, the location may be based on a known location of the first entity and an identifier of the static QR code. As another example, for a dynamic QR code, the location may be based on a location of the device requesting the QR code and/or an expected location of the first entity. If the location identifier does not match with the QR code identifier, the QR code may not be verified.

In some embodiments, a QR code may include one or more fields of information embedded or encrypted into the QR code. The example fields and values may relate to a first entity that is a merchant. Examples of such fields and information may include those illustrated in Table 1, where Field identifies an example field of information in the QR code, Key identifies a short name identifier for the field, Notes provide details regarding the Field, and Value/Example provides an example of what a format of the information in the field:

TABLE 1

| Field | Key | Note | Value/Example |
| --- | --- | --- | --- |
| Identifier | header | Five-character abbreviation for Short Payment Descriptor | PYPL0 |
| Version | header | version of the QR code | 01 |
| First Entity Identifier | NAME | Alphanumeric string | "First Entity Name" |
| Merchant Store Identifier | MSID | Numerical identifier of a particular location of a merchant | 0039 |
| QR code identifier | QRCID | QR code identifier associated with the first entity identifier and location identifier | 888000112345 |
| Code generation Stamp | GEN | Timestamp in GMT that the QR code was generated (in YYYY-MM-DD HHmm format) | 2014-06-07 1749 UTC |
| Code expiration Stamp | EXP | Timestamp in GMT when the QR code expires (in YYYY-MM-DD HHmm format) | 2014-06-07 1749 UTC |
| Hash Version | HID | Numerical identifier of version of hash function used to encrypt data in QR code | 1 or 2 |
| Signature | footer | Security signature identifying validity of entity generating the QR code | ATD8jcx8PQw51wxdsP0W54KUfZmdrPBLO |

In some embodiments, the QR code may include one or more security features to generate a secure QR code. For example, the QR code may include a digital signature (e.g., the Signature from Table 1), a hashed implementation of the data (e.g., and/or a hash version of the algorithm used to hash the data of the QR code), etc. In these and other embodiments, the QR code may utilize a hash-based message authentication code (HMAC) that may utilize any cryptographic function, such as a Message Digest 5 (MD5) algorithm or Secure Hash Algorithm 1 (SHA-1), etc.

The second entity device 110 may include any device used by a second entity to facilitate participation in QR code based data transfers. The second entity device 110 may include a mobile device, a cellular device, a tablet, a wearable electronic device, etc. In some embodiments, the second entity device 110 may include a communication device 112, an optical scanner 114, and/or a display 116. The communication device 112 may be utilized to communicate with the first entity electronic device 130/140 and/or the support server 120. The optical scanner 114 may be configured to scan a QR code as presented by the first entity, and the display 116 may be configured to display a QR code to be scanned by the first entity electronic device 130/140.

The support server 120 may include one or more computing devices configured to register and otherwise prepare a first entity to participate in QR code based data transfers, and facilitate the QR code based data transfer between the second entity and the first entity. In some embodiments, the support server 120 may be configured to facilitate the selection of a flow to be used by the first entity. For example, the support server 120 may remove certain flows from a list of flows to be presented to the first entity or may provide a recommendation of a flow to a first entity during the registration of the first entity.

In some embodiments, the support server 120 may communicate with the second entity device 110 and/or the first entity device 130/140 during a QR code based data transfer. In these and other embodiments, the support server 120 may utilize information embedded in a scanned QR code, or in information extracted from a QR code and communicated to the support server 120, to determine which flow to follow in supporting the QR code based data transfer. As explained below in the various figures, the support server 120 may facilitate the QR code based data transfers according to the appropriate flow based on the identified flow.

In some embodiments, the support server 120 may include a QR code processing module 122, a payment processing module 124, and a location services module 126. In some embodiments, one or more components of the support server 120 may communicate and coordinate with each other during a QR code based data transfer. One or more examples of operation of the support server 120 may be observed with reference to FIGS. 2-7.

The QR code processing module 122 may include code and routines configured to enable a computing device to process QR codes. Additionally or alternatively, the QR code processing module 122 may be implemented using hardware including a processor, a microprocessor (e.g., to perform or control performance of one or more operations), a field-programmable gate array (FPGA), or an application-specific integrated circuit (ASIC). In some other instances, the QR code processing module 122 may be implemented using a combination of hardware and software. In the present disclosure, operations described as being performed by the QR code processing module 122 may include operations that the QR code processing module 122 may direct a corresponding system (e.g., the support server 120) to perform.

The QR code processing module 122 may be configured to interact with the first entity device 130/140, the second entity device 110, other components of the support server, or any combination thereof, in generating, verifying, validating, storing, or otherwise processing a QR code associated with a party or a data transfer. In some embodiments, the QR code processing module 122 may offer one or more application programming interface (API) calls such that the interaction from the second entity device 110, the first entity device 130/140, and/or other electronic devices may be via an API call to the support server 120.

In some embodiments, the QR code processing module 122 may be utilized in the registration process to prepare a first entity to handle QR code based data transfers. For example, for certain selected flows, the QR code processing module 122 may generate a static QR code to be provided to the first entity in response to a request. In these and other embodiments, the static QR code may include the QR code identifier to facilitate the identification of which flow a data transfer is to follow.

In some embodiments, the QR code processing module 122 may be utilized in the handling of QR code based data transfers. For example, the second entity device 110 may request that the QR code processing module 122 generate a QR code. In response, the QR code processing module 122 may generate a dynamic QR code specific to the data transfer, or for a static QR code, may provide the previously generated QR code unless the QR code has expired.

In some embodiments, the QR code processing module 122 may facilitate the identification of which flow a data transfer is attempting to utilize. For example, the QR code processing module 122 may decrypt or otherwise extract information (such as the QR code identifier) from the QR code such that the support server 120 may distinguish which of the potential flows the first entity is configured to use. For example, the QR code processing module 122 may read from the QR code an amount of a data transfer, whether the QR code is dynamic or static, etc. Additionally or alternatively, the QR code processing module 122 may extract the QR code identifier and the first entity identifier from the QR code identifier. The QR code processing module 122 may determine the flow associated with the first entity associated with the first entity identifier and may configure the support server 120 to facilitate the QR code based data transfer based on the identified flow. In some embodiments, the QR code processing module 122 may provide the first entity identifier to the payment processing module 124 to determine the flow and/or to configure the support server 120 to operate to facilitate the data transfer according to the flow.

The payment processing module 124 may include code and routines configured to enable a computing device to process payments. Additionally or alternatively, the payment processing module 124 may be implemented using hardware including a processor, a microprocessor (e.g., to perform or control performance of one or more operations), a field-programmable gate array (FPGA), or an application-specific integrated circuit (ASIC). In some other instances, the payment processing module 124 may be implemented using a combination of hardware and software. In the present disclosure, operations described as being performed by the payment processing module 124 may include operations that the payment processing module 124 may direct a corresponding system (e.g., the support server 120) to perform.

The payment processing module 124 may be configured to interact with the first entity device 130/140, the second entity device 110, other components of the support server 120, third party financial computing devices, or any combination thereof, in validating, verifying, and/or transferring an amount of the data transfer. For example, the payment processing module 124 may be configured to verify an amount of the data transfer, verify availability of funds, and transfer or request transfer of funds from one account to another. In some embodiments, one or more of the accounts may be associated with PAYPAL®. In some embodiments, the payment processing module 124 may offer one or more application programming interface (API) calls such that the interaction from the second entity device 110, the first entity device 130/140, and/or other electronic devices may be via an API call to the support server 120.

In some embodiments, the payment processing module 124 may facilitate filtering or recommending certain flows to the first entity when selecting a flow. For example, the payment processing module 124 may maintain risk profiles for various markets and/or incidence of fraud for various merchants such that the payment processing module 124 may remove certain flows from being presented to the first entity. In some embodiments, based on a risk profile of a market in which the first entity operates being high, the payment processing module 124 may limit the first entity to selecting a flow that includes a high security feature, such as a flow that uses dynamic QR codes rather than a static QR code. Additionally or alternatively, one or more properties of the flows may be modified. For example, the expiration date of the QR code may be shortened for a high risk profile market. As another example, a more secure version of a hash function performed on the QR code may be utilized or a more secure signature of the QR code may be utilized.

In some embodiments, the payment processing module 124 may cause the support server 120 to facilitate one or more digital handshakes between the second entity device 110 and the first entity device 130/140. Such a digital handshake may utilize secure socket layers (SSL) and may involve multiple exchanges of information between the support server 120, the second entity device 110 and/or the first entity device 130/140.

The location services module 126 may include code and routines configured to enable a computing device to identify a location, compare two locations, interact with global positioning system (GPS) services, etc. Additionally or alternatively, the location services module 126 may be implemented using hardware including a processor, a microprocessor (e.g., to perform or control performance of one or more operations), a field-programmable gate array (FPGA), or an application-specific integrated circuit (ASIC). In some other instances, the location services module 126 may be implemented using a combination of hardware and software. In the present disclosure, operations described as being performed by the location services module 126 may include operations that the location services module 126 may direct a corresponding system (e.g., the support server 120) to perform.

The location services module 126 may be configured to interact with the first entity device 130/140, the second entity device 110, or any combination thereof, in verifying, checking, or otherwise determining location properties of the data transfer. For example, the location services module 126 may determine a location of the first entity device 130/140, a location associated with the QR code, a location of the second entity device 110, a location of where the QR code was generated, a location of where the QR code was scanned, etc. In some embodiments, the location services module 126 may offer one or more application programming interface (API) calls such that the interaction from the second entity device 110, the first entity device 130/140, and/or other electronic devices may be via an API call to the support server 120.

In some embodiments, the location services module 126 may facilitate the selection or recommendation of a flow during registration of a first entity for QR code based data transfers. For example, the location services module 126 may determine the location of the first entity such that certain potential flows may not be presented as possible selections based on the location of the first entity (e.g., because the first entity is in a high crime area).

In some embodiments, the support server 120 may store information regarding the first entity associated with the first entity device 130/140. For example, the support server 120 may store information as described above in association with the initial registration. As another example, the support server 120 may store information regarding what flow the first entity has selected for QR code based data transfers, identifiers for one or more QR codes associated with the first entity, a physical location of the first entity (including each branch of the first entity), or the physical location of data transfers with the first entity, whether the first entity is a mobile merchant (e.g., a food truck), etc.

In some embodiments, the first entity device 130/140 may be similar or comparable to the second entity device 110. The first entity device 130/140 may include any device used by the first entity (e.g., a merchant) to register to participate in QR code based data transfers and/or otherwise facilitate participation in QR code based data transfers. In some embodiments, the first entity device 130/140 may receive a recommendation or a set of flows to select from and may present the recommendation or the set of flows to a first entity for selection during the registration process. In some embodiments, the first entity device 130/140 may communicate with or be part of other merchant systems, such as an inventory processing system configured to monitor, track, or otherwise account for inventory of the first entity, a checkout system configured to aggregate items for purchase at the first entity, a payment system configured to request or accept payment, etc. In some embodiments, the first entity device 130/140 may include a communication device 142, an optical scanner 144, and/or a display 146. The communication device 142 may be utilized to communicate with the second entity device 110 and/or the support server 120. The optical scanner 144 may be configured to scan a QR code as presented by the second entity, and the display 146 may be configured to display a QR code to be scanned by the second entity device 110.

In some embodiments, the first entity device 130 may be associated with a merchant at a fixed location, such as a brick and mortar store. In these and other embodiments, the location of the first entity device 130 may be presumed to be stationary for all data transfers. In some embodiments, if a merchant has multiple locations, such as multiple branches, the location of each branch may be stored by the support server 120 and each branch may have a unique identifier. In some embodiments, the first entity device 140 may be associated with a mobile merchant, such as a food truck, a plumber, etc.

While both the second entity device 110 and the first entity device 130/140 are illustrated as displaying a QR code, it will be appreciated that for a given data transfer, one of the devices may display the QR code and the other device may scan the QR code. Additionally or alternatively, a static QR code may be generated and printed or otherwise reproduced and scanned by the other party.

In some embodiments, the support server 120 may provide an entire QR code based data transfer system that the first entity may incorporate into an experience provided by the first entity. For example, the first entity may include a merchant and the data transfer may include a financial transaction between a consumer and the merchant. The merchant may utilize various web or other computer-based elements in the payment interface of the merchant and may incorporate the QR code based transaction elements into the payment interface of the merchant. In these and other embodiments, in implementing the data transfer processing flow, the support server 120 may store uniform resource locators (URLs) or other identifying information of the various components of the payment interface of the merchant. Additionally or alternatively, the functionality of the support server 120 may be invoked by application programming interface (API) calls within the programming code of the merchant. In these and other embodiments, the various processing flows may be folded into existing merchant-designed payment flows and interactions with their customers. For example, the POS terminals and splash screens used by a merchant may be configured to make an API call to the support server 120 to generate and return a QR code to be displayed in a particular field of the splash screen of the merchant.

The network 150 may be any device, system, component, or combinations thereof to facilitate communication between any of the other components of the system 100. In some embodiments, the network 150 may represent a logical set of protocols or instructions, for example, a set of protocols used as the second entity device 110 and the first entity device 130/140 communicate directly with each other. In some embodiments, the network 150 may include one or more wide area networks (WANs) and/or local area networks (LANs) that enable the second entity device 110, the support server parties 120, and/or the first entity device 130/140 to be in communication. In some embodiments, the network 150 may include the Internet, including a global internetwork formed by logical and physical connections between multiple WANs and/or LANs. Alternately or additionally, the network 150 may include one or more cellular RF networks and/or one or more wired and/or wireless networks such as, 802.xx networks, Bluetooth access points, wireless access points, IP-based networks, or the like. The network 150 may also include servers that enable one type of network to interface with another type of network. Additionally or alternatively, the network 150 may include an Intranet, or one or more computing devices in communication within an organization or in an otherwise secure manner.

One skilled in the art, after reviewing this disclosure, may recognize that modifications, additions, or omissions may be made to the system 100 without departing from the scope of the disclosure. For example, any number of merchants with any number of branch locations and/or mobile locations may be included within the scope of the present disclosure. As another example, the support server 120 may be divided into multiple computing devices in communication with one another.

FIGS. 2-7 illustrate various flow diagrams of example methods of performing QR code based data transfers. The method of FIG. 2 may represent a generic method of performing QR code based data transfers, with FIGS. 3-7 illustrating specific iterations of flows for QR code based data transfers. For each of the methods, one or more operations of the methods may be performed by a system or device, such as the second entity device 110, support server 120, and/or first entity devices 130/140 of FIG. 1, or any combination thereof. In these and other embodiments, the operations may be performed based on execution of instructions stored on one or more non-transitory computer-readable media. Although illustrated as discrete blocks, various blocks of the various methods may be divided into additional blocks, combined into fewer blocks, or eliminated, depending on the desired implementation.

One skilled in the art, after reviewing this disclosure, may recognize that modifications, additions, or omissions may be made to the various methods of FIGS. 2-7 without departing from the scope of the disclosure. For example, the operations of the various methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 2:
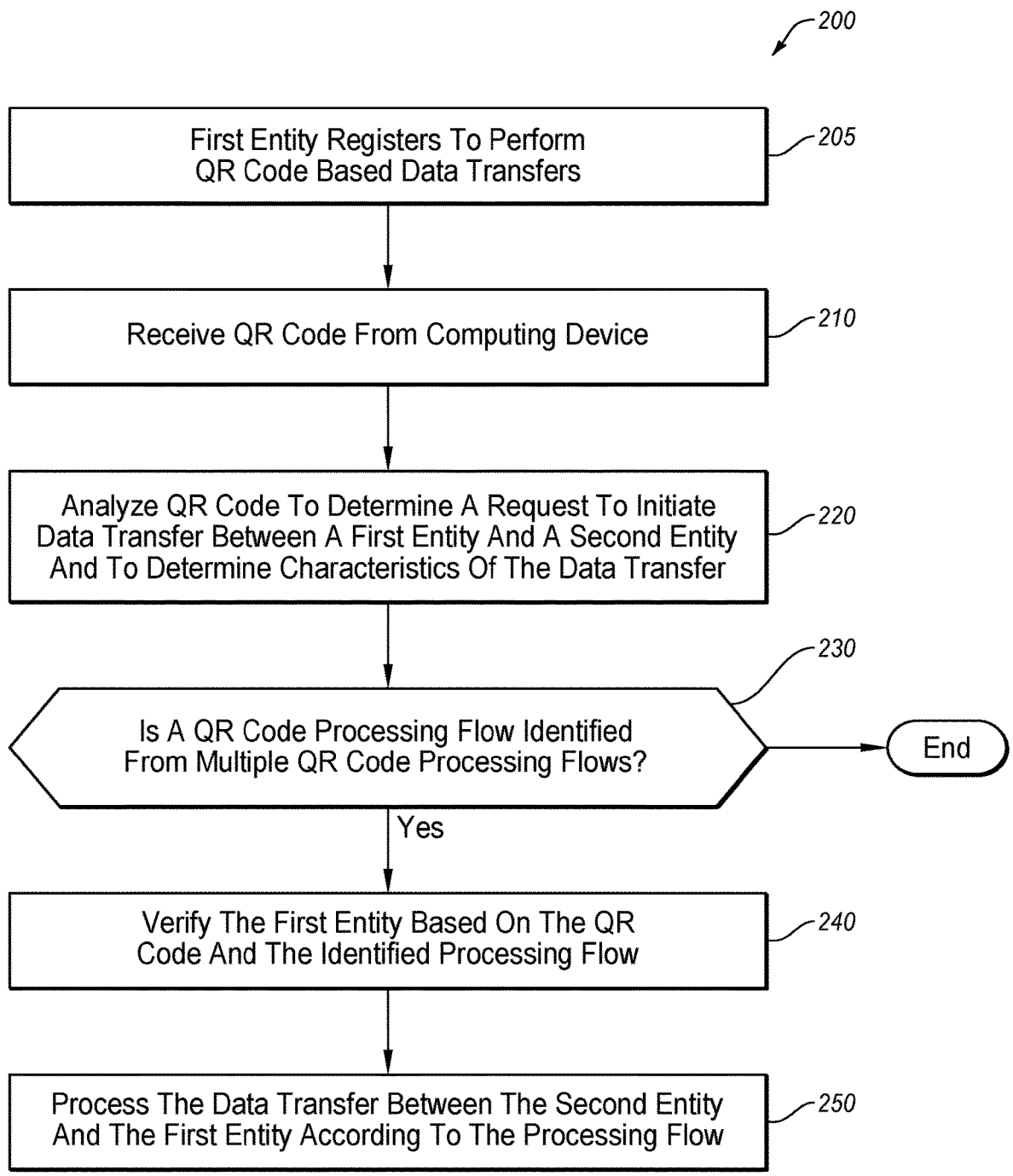
FIG. 2 is a flow diagram illustrating an example method of a QR code based data transfer.

With reference to FIG. 2, at block 205, a first entity may engage in a registration process in order to perform QR code based data transfers. For example, a first entity may register with a support server (such as the support server 120 of FIG. 1) to engage in QR code based data transfers. In these and other embodiments, the registration process may include a series of questions and/or input sought from the first entity such that a QR code based data transfer may be supported.

In some embodiments, such a registration process may include the removal of one or more of multiple potential processing flows such that the first entity is presented with a list of less than all potential processing flows when selecting which flow to utilize in performing QR code based data transfers. In these and other embodiments, the registration may include the support server storing and/or generating various pieces of information related to the first entity. Such information may include a first entity identifier, a location identifier (which may be different for different locations of the same first entity such as different branches of the same merchant), address details (e.g., a street address of the first entity, an IP address of the first entity, etc.), a geolocation of the first entity (e.g., latitude and longitude of the location as identified by a location services module), a phone number of the first entity, and one or more characteristics associated with the selected flow. For example, such characteristics may include which of the potential flows is selected by the first entity, whether pairing is utilized by the flow selected by the first entity, which party to the data transfer is to scan the QR code and/or display the QR code, whether or not the QR code includes an amount of the data transfer, notification details associated with the flow (e.g., which entities receive confirmation notifications, approval notifications, etc.), and/or any combination of the foregoing.

In some embodiments, for example, when a flow that utilizes a static QR code is selected, the block 205 may additionally include generation of a QR code. For example, a QR code processing module of the support server may generate a static QR code based on the merchant identifier and/or the location identifier.

At block 210, a QR code may be received from a computing device. For example, a second entity device (such as the second entity device 110 of FIG. 1) may scan a QR code displayed by a first entity (e.g., by a merchant device (such as the first entity device 130/140 of FIG. 1) or as physically displayed by the first entity). As another example, a first entity device may scan a QR code as displayed on a second entity device. In these and other embodiments, the scanned QR code may be transmitted to and received by a support server (such as the support server 120 of FIG. 1) for processing.

At block 220, the QR code may be analyzed to determine a request to initiate a data transfer (e.g., a payment transaction) between the first entity and the second entity. Additionally or alternatively, the QR code may be scanned to determine payment characteristics of the data transfer. In some embodiments, the QR code may have characteristics of the data transfer embedded within the QR code. Such characteristics may include an identifier of which of multiple potential processing flows the support server is to follow in processing the data transfer. For example, the characteristics may include information such as whether the QR code is a first entity-generated QR code (e.g., a merchant-generated QR code) or a second entity-generated QR code (e.g., consumer-generated QR code), an amount of the data transfer, whether the QR code is a static or dynamic QR code, a first entity associated with the QR code, a location of the first entity, a location of where the QR code is generated, etc., which as indicated above may each be associated with different types of flows In some embodiments, the QR code may be analyzed by a scanning device and characteristics may be transmitted to the support server. In some embodiments, the QR code may include a field or other identifier that specifically identifies which of the potential flows the QR code is generated to follow.

At block 230, a determination may be made of whether a QR code processing flow is identified from multiple potential QR code processing flows. In some embodiments, such a determination may be based on the characteristics. For example, the support server may be configured to process QR code based data transfers along any of multiple potential flows. The support server may identify which flow is associated with the first entity based on the characteristics from the block 220. Various examples of the potential flows are identified in FIGS. 3-7. For example, one flow (FIG. 3) may utilize a static QR code generated by a merchant without an amount embedded in the QR code and scanned by a consumer, where the consumer enters the amount for a transaction; another flow (FIG. 4) may include a static QR code generated by the merchant without the amount embedded in the QR code and scanned by the consumer, where the merchant enters the amount for the transaction; an additional flow (FIG. 5) may include a dynamic QR code generated by the merchant with the amount embedded in the QR code and scanned by the consumer, where the consumer approves the amount as embedded in the QR code by the merchant; another flow (FIG. 6) may include a dynamic QR code generated by the consumer without the amount and scanned by the merchant, where the merchant enters the amount and the consumer approves the amount; and another flow (FIG. 7) may include a dynamic QR code generated by the consumer with the amount embedded in the QR code and scanned by the merchant, where the merchant approves the amount.

In some embodiments, the support server may determine which party (e.g., the first entity or the second entity) is transmitting the initial message of the data transfer (e.g., the party that scanned the QR code), whether the transmission includes an amount embedded in the QR code (either via the QR code itself or as extracted by the scanning device), whether the QR code is dynamic or static (e.g., by analyzing the expiration date of the QR code or a characteristic directly identifying whether the QR code is static or dynamic), etc. Using such characteristics, the support server may identify a particular flow and may proceed to the block 240. If no QR code processing flow is identified, the method 200 may proceed to the block 235 and an error message may be sent back to the device that transmitted the QR code and/or to the first entity and the method 200 may end.

At block 240, the first entity (e.g., a merchant) for the data transfer may be verified based on the QR code and the identified processing flow. For example, the support server may look up information from the QR code in a database to verify that the information is consistent with the information stored in the database as associated with the first entity. For example, the support server may verify that the characteristics are consistent with the flow selected by the first entity to perform the QR code based transactions for the first entity. As another example, the support server may verify that the QR code identifies the correct first entity and the correct location of the first entity. In these and other embodiments, verifying the first entity may assist in preventing fraud or other problems with the transaction. For example, when a static QR code is used, there may be a risk that a third party may steal or replicate the QR code and attempt to use the QR code to surreptitiously perform transactions. By verifying the first entity, such attempts may be avoided. In some embodiments, the verification may include any of a variety of verifications, such as verifying that the location from which the QR code was scanned or generated matches a location for the first entity as stored by the support server. In some embodiments, verification of the first entity may be a prerequisite to proceeding with a transfer of funds for the transaction. As an additional example, the support server may verify that the signature of the QR code is properly authenticated (e.g., the QR code includes an up to date electronic signature from the support server).

At block 250, in response to the first entity being verified, the data transfer between the second entity and the first entity may be processed according to the identified processing flow. For example, the support server may perform any additional tasks to verify the transaction, an amount of the transaction, the identity of the parties, etc. Additionally or alternatively, the block 250 may include transferring or requesting transfer of funds from an account associated with the second entity to an account associated with the first entity.

FIGS. 3-7 provide examples of QR code based data transfers where the first party may include a merchant and the second party may include a consumer and the QR code based data transfer (e.g., a data transfer) may include a QR code base transaction. In these and other embodiments, the characteristics of the flows may include payment characteristics. While provided as an example, the same types of flows may also be applicable to other data transfers and other entities.

Figure 3:
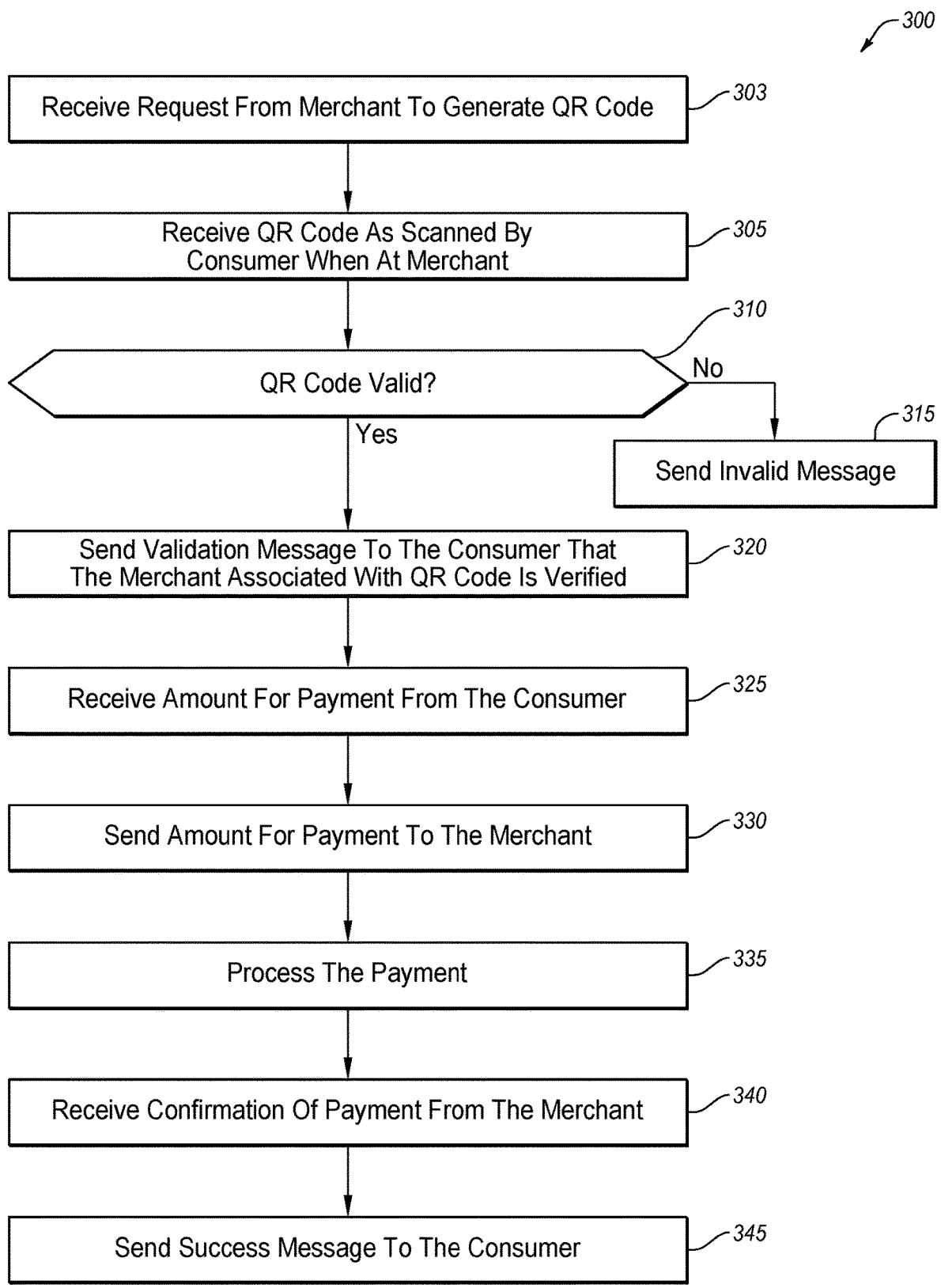
FIG. 3 is a flow diagram illustrating another example method of a QR code based data transfer.

FIG. 3 may illustrate one potential flow of a QR code based transaction. The flow of FIG. 3 may include a flow in which the payment characteristics include that the QR code is static, generated by the merchant, and scanned by the consumer. The consumer may enter the amount of the transaction, and the merchant may verify completion of the transaction. Such a flow may be beneficial as such a flow may exclude pairing between the merchant device and the consumer device. Additionally, such a flow may utilize a low amount of network traffic, such that the flow may be utilized in locations with a limited network infrastructure. Additionally, the flow may support situations in which the merchant is mobile and/or otherwise is not on a particular physical premise. Such a flow may be particularly beneficial to a small merchant or solo practitioner, or other merchant with minimal or limited computer infrastructure. Additionally, such a flow may be beneficial for merchants in countries or regions of the world with limited network infrastructure, or for merchants with slow Internet connections.

At block 303, a request to generate a QR code may be received from a merchant. For example, when initially registering to process QR code based transactions, the merchant may submit a request to a support server (e.g., the support server 120 of FIG. 1) to generate a QR code. The request may be handled by the QR code processing module 122 and may utilize information received from the merchant to encrypt or otherwise generate the QR code. For example, the QR code processing module 122 may invoke the location services module 126 to determine a location of the merchant, and generate a QR code identifier based on the location, the merchant identifier, and/or other information regarding the merchant in generating the QR code. Additionally or alternatively, the QR code may include a signature from the support server 120 indicating an approved QR code and/or an approved merchant. In these and other embodiments, the QR code may be hashed using a pre-selected hash algorithm. In some embodiments, the version of the hash used may be embedded, encrypted, or otherwise included in the QR code such that a scanning device may be able to decrypt the QR code and verify the signature from the support server 120.

At block 305, a QR code may be received as scanned by a consumer when at a merchant. For example, a merchant may generate a QR code (e.g., when initially registering to process QR code based transactions) and may display the QR code in a physical format (e.g., printed off) or in an electronic form (e.g., displayed on a screen). The consumer may use a consumer device (such as the consumer device 110 of FIG. 1) to scan the QR code.

At block 310, a determination may be made whether the QR code is valid. In some embodiments, a program operating on the consumer device may operate to verify information regarding the QR code. Additionally or alternatively, the consumer device may transmit the QR code (and/or information derived from scanning the QR code) to a support server. For example, the consumer device may transmit the QR code to a QR code processing device of the support server, or to a payment processing device that may in turn query the QR code processing device. The support server may decrypt or otherwise derive the information stored in the QR code and may verify information regarding the merchant, the consumer, etc. In some embodiments, the support server may store information regarding the transaction, such as information regarding the consumer, the merchant, the QR code, etc. for the transaction. In some embodiments, the support server may generate a transaction identifier associated with the transaction. If the QR code is determined to be invalid, the method 300 may proceed to the block 315. If the QR code is determined to be valid, the method 300 may proceed to the block 320.

At block 315, a message may be returned that the QR code is invalid. For example, a message may be provided to the consumer that scanned the QR code that the QR code is invalid. In some embodiments, a reason for the invalidity of the QR code may be provided (e.g., invalid merchant, invalid location for merchant, etc.).

At block 320, a validation message may be sent to the consumer that the merchant associated with the QR code is verified. For example, the support server may transmit a message to the consumer electronic device that the merchant has been verified. In some embodiments, such a communication may include the transaction identifier.

In some embodiments, in response to the validation message, the consumer electronic device may prompt the consumer to input an amount for the transaction. For example, the consumer electronic device may provide an interface to the consumer to input that amount that the consumer intends to pay the merchant.

At block 325, the amount for the payment may be received from the consumer. For example, in response to inputting the amount, the consumer device may transmit the amount to the support server.

At block 330, the payment may be processed by the support server. For example, the support server may transfer an amount of funds from a consumer account associated with the support server to a merchant account associated with the support server. As another example, the support server may send a request to a financial institution with which the consumer has a relationship to transfer the amount of the payment to an account associated with the merchant at the same or a different financial institution. In these and other embodiments, the processing of the payment may be invoked via an API call from one of the merchant or the consumer devices to the support server.

At block 335, a confirmation of payment may be received from the merchant. For example, the merchant may transmit a message to the support server that a confirmation of funds for the amount of the transaction has been received.

At block 340, a success message may be sent to the consumer. For example, the support server may transmit a message to the consumer device indicating that the processing of the transaction is completed.

Figure 4:
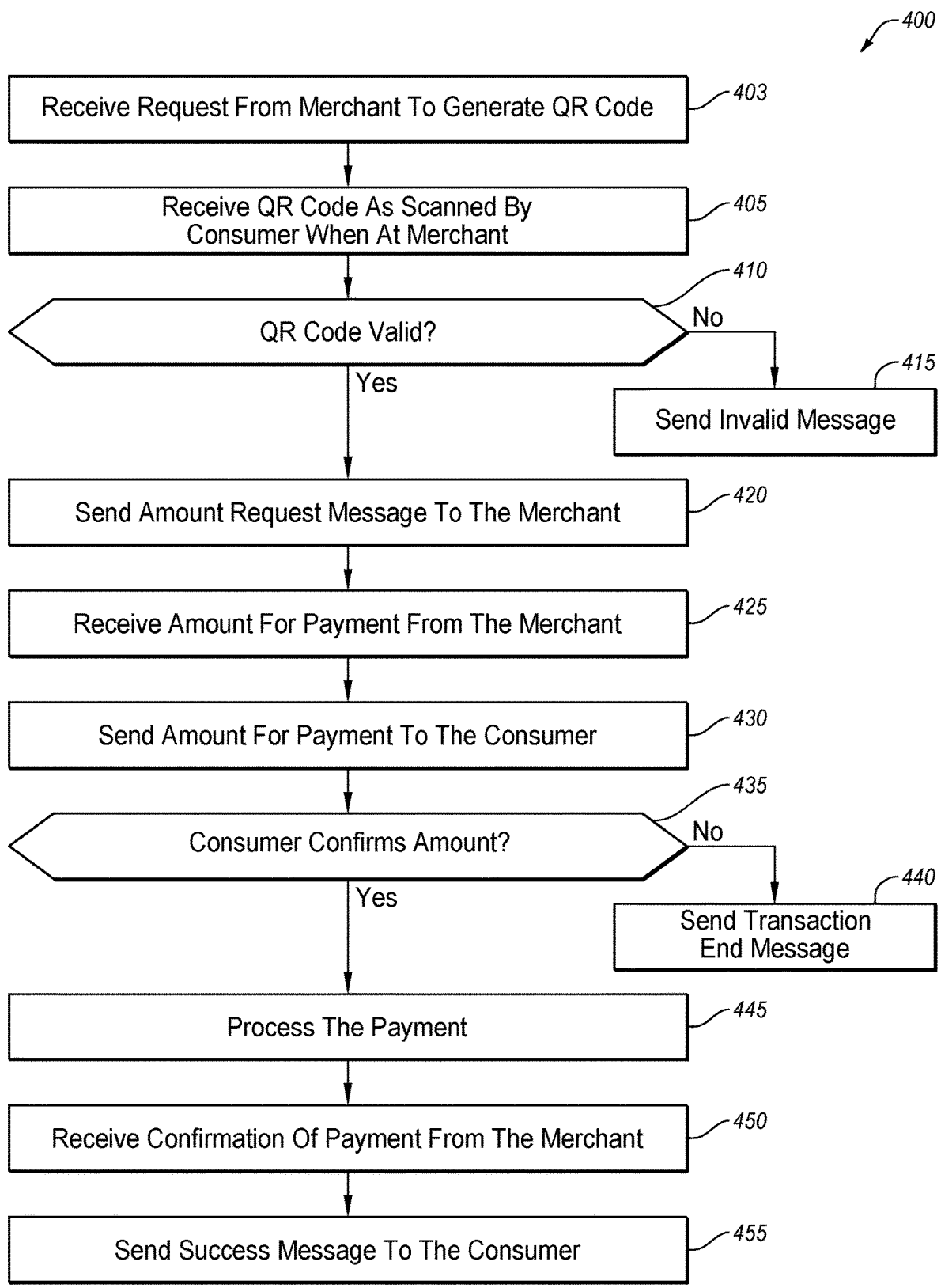
FIG. 4 is a flow diagram illustrating another example method of a QR code based data transfer.

FIG. 4 may illustrate one potential flow of a QR code based transaction. The flow of FIG. 4 may include a flow in which the payment characteristics include that the QR code is static, generated by the merchant, and scanned by the consumer. The merchant may enter the amount of the transaction, and the consumer may confirm the amount. Such a flow may utilize pairing between the merchant device and the consumer device. Such a flow may include a high level of trust in the transaction as the merchant enters the amount, and the consumer approves the amount such that both parties have input into the transaction. Additionally, such a flow may utilize a high amount of network traffic, as numerous messages may be passed between the various parties and secure connections may be formed.

At block 403, a request to generate a QR code may be received from a merchant. The block 403 may be similar or comparable to the block 303 of FIG. 3.

At block 405, a QR code may be received as scanned by a consumer when at a merchant. The block 405 may be similar or comparable to the block 305 of FIG. 3.

At block 410, a determination may be made whether the QR code is valid. The block 410 may be similar or comparable to the block 310 of FIG. 3. If the QR code is determined to be invalid, the method 400 may proceed to the block 415. If the QR code is determined to be valid, the method 400 may proceed to the block 420.

At block 415, an invalid message may be sent to the consumer. The block 415 may be similar or comparable to the block 315 of FIG. 3.

At block 420, an amount request message may be sent to the merchant. For example, upon a determination that the QR code is valid, a consumer device may submit an API to the support server indicating that the consumer intends to make a payment to the merchant. The API call may cause the support server to send the amount request message to the merchant.

At block 425, an amount for payment may be received from the merchant. For example, in response to the request for the amount, the merchant may input an amount for the payment into the merchant device. For example, the amount request message may cause the merchant device to load a user interface into which the merchant enters the amount of the transaction. The merchant device may transmit the amount to the support server.

At block 430, the amount for payment may be sent to the consumer. For example, the API call may be responded to with the amount as entered by the merchant.

At block 435, a determination may be made whether the consumer confirms the amount for the transaction. If the consumer does not confirm the amount, the method 400 may proceed to the block 440. If the consumer does confirm the amount, the method 400 may proceed to the block 445.

In these and other embodiments, the blocks 425 through 435 may include one or more SSL handshake exchanges between the merchant device and/or the consumer device such that the amount entered and verified may be securely handled. In these and other embodiments, such SSL handshakes may be facilitated by a pairing engine of the support server.

At block 440, a transaction end message may be sent to the consumer and/or the merchant. For example, if the merchant entered an incorrect amount or if the consumer changed their mind, the consumer may decline to confirm the amount for the transaction.

At block 445, the payment may be processed in response to the consumer confirming the amount. The block 445 may be similar or comparable to the block 330 of FIG. 3.

At block 450, confirmation of payment may be received by the support server from the merchant. The block 450 may be similar or comparable to the block 335 of FIG. 3.

At block 455, a success message may be sent to the consumer. The block 455 may be similar or comparable to the block 340 of FIG. 3.

Figure 5:
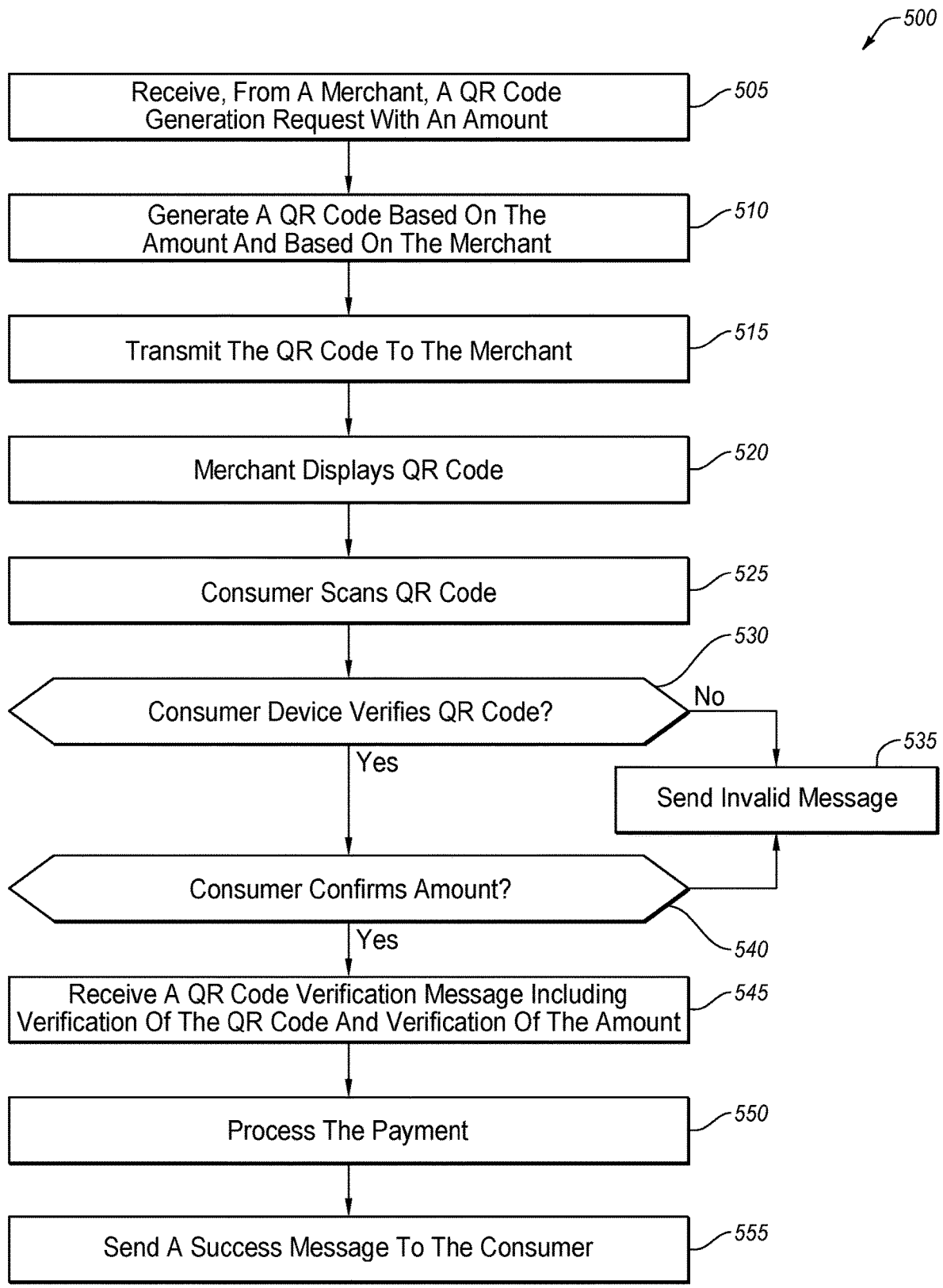
FIG. 5 is a flow diagram illustrating another example method of a QR code based data transfer.

FIG. 5 may illustrate one potential flow of a QR code based transaction. The flow of FIG. 5 may include a flow in which the payment characteristics include that the QR code is dynamic (e.g., generated fresh for each transaction), generated by the merchant, and scanned by the consumer. The QR code may additionally include the amount of the transaction, and the consumer may confirm the amount. Such a flow may include a high level of trust in the transaction as the merchant generates the amount, and the consumer approves the amount such that both parties have input into the transaction. Additionally, such a flow may utilize a low amount of network traffic. Such a flow may be particularly beneficial to a small merchant or solo practitioner, or other merchant with minimal or limited computer infrastructure. Additionally, such a flow may be beneficial for merchants in countries or regions of the world with limited network infrastructure, or for merchants with slow Internet connections.

At block 505, a QR code generation request may be received from a merchant. For example, a merchant may submit a request to a support server to generate a QR code. In some embodiments, the request may include an amount for a transaction. For example, a merchant may manually input an amount or a merchant device may automatically generate an amount (e.g., by subtotaling scanned items at a retailer) and an API call may be sent from the merchant device to the support server to generate a QR code that includes the amount of the transaction.

At block 510, a QR code may be generated based on the amount in the request of block 505 and based on the merchant. For example, a QR processing component of the support server may incorporate the received amount as well as other information from or about the merchant into the QR code. Such other information may include a merchant identifier, a location of the merchant or a location of a branch of the merchant, etc.

At block 515, the QR code may be transmitted to the merchant. For example the support server may transmit the QR code to the merchant device.

At block 520, the merchant may display the QR code. For example, the merchant device may receive the QR code from the support server and may display the QR code on a display of the merchant device.

At block 525, the consumer may scan the QR code. For example, the consumer may use an optical scanner of the consumer device to scan the QR code from the display of the merchant device.

At block 530, a determination may be made whether the consumer device verifies the QR code. The block 530 may be similar or comparable to the block 310 of FIG. 3. For example, an application or other software running on the consumer device may decrypt the QR code and verify one or more security features of the QR code to verify that the QR code is valid. Additionally or alternatively, the consumer device may verify that the QR code is successfully scanned such that the consumer device is able to obtain information contained in the QR code. If the consumer device does not verify the QR code, the method 500 may proceed to the block 535. If the consumer device does verify the QR code, the method 300 may proceed to the block 540.

At block 535, an invalid message may be sent regarding the transaction. The block 535 may be similar or comparable to the block 315 of FIG. 3.

At block 540, a determination may be made whether the consumer confirms the amount of the transaction. For example, in response to the QR code being verified, the consumer device may present the amount of the transaction as contained in the QR code to the consumer to verify the amount. If the consumer does not verify the amount, the method 500 may return to the block 535 where an invalid message may be sent regarding the transaction. If the consumer verifies the amount, the method 500 may proceed to the block 550.

At block 545, a QR code verification message may be received. In some embodiments, the QR code verification message may include an indication that the QR code is verified and that the amount of the transaction is verified. For example, the consumer device may transmit the QR code message to the support server in response to the QR code and the amount being verified.

At block 550, the payment may be processed. The block 550 may be similar or comparable to the block 335 of FIG. 3.

At block 555, a success message may be sent to the consumer. The block 555 may be similar or comparable to the block 345 of method 3.

Figure 6:
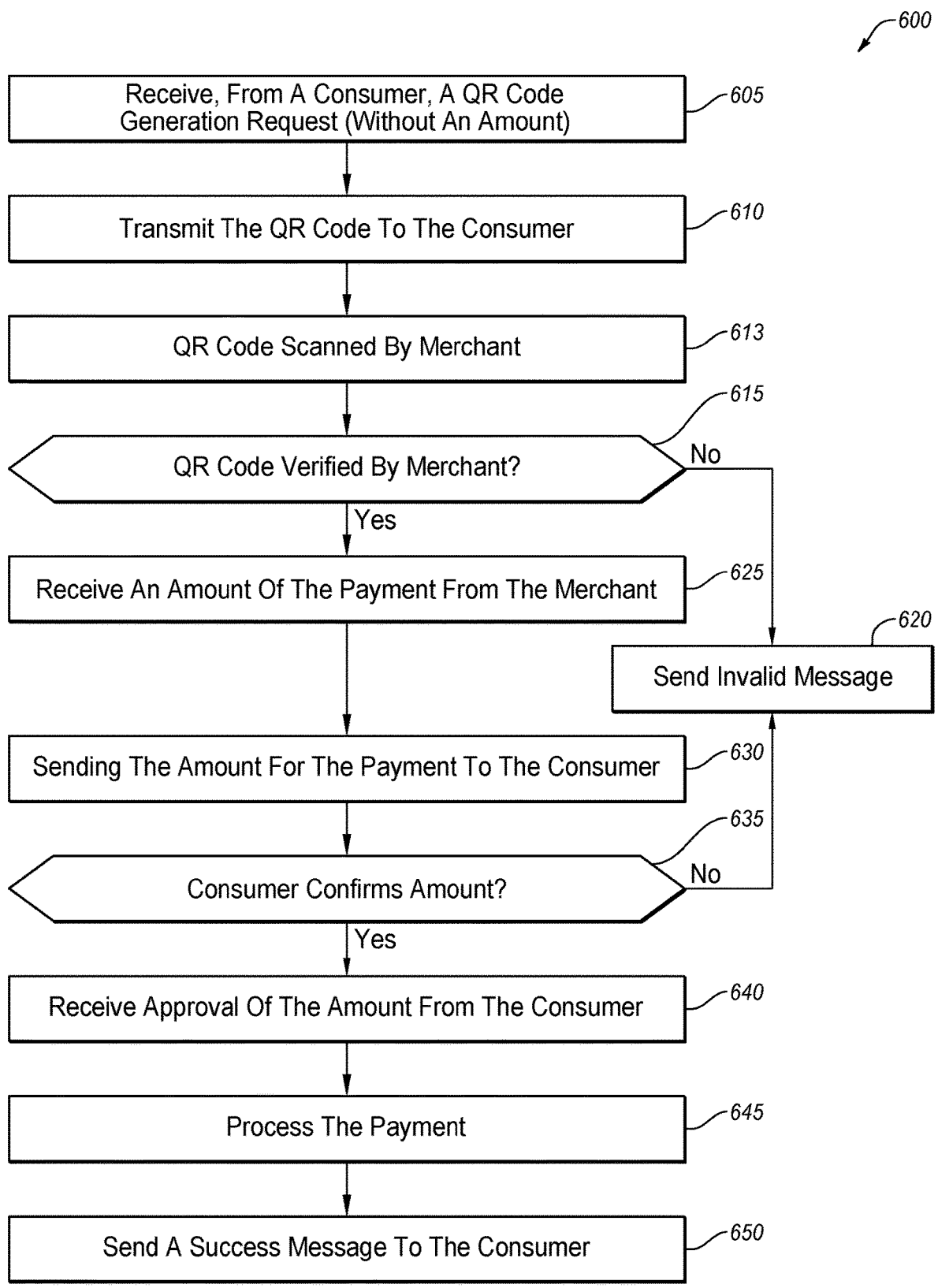
FIG. 6 is a flow diagram illustrating another example method of a QR code based data transfer.

FIG. 6 may illustrate one potential flow of a QR code based transaction. The flow of FIG. 6 may include a flow in which the payment characteristics include that the QR code is dynamic (e.g., generated fresh for each transaction), generated by the consumer, and scanned by the merchant. The QR code, while specific to the transaction, may exclude the amount of the transaction. The merchant may scan the QR code, and may enter the amount (either in an automated manner from the merchant device or from the merchant manually inputting the amount), and the consumer may verify the amount. Such a flow may include a high level of trust in the transaction as the merchant provides the amount, and the consumer approves the amount such that both parties have input into the transaction. Such a flow may additionally utilize pairing to provide increased security. Additionally, such a flow may utilize a high amount of network traffic. Such a flow may be particularly beneficial to larger merchants, or merchants with a robust computer infrastructure. Additionally, such a flow may be beneficial for merchants in countries or regions of the world with developed network infrastructure, or for merchants with high-speed Internet connections at their premises. The flow of FIG. 6 may provide a flow with additional security features as compared to the previous flows.

At block 605, a QR code generation request may be received from a consumer. For example, a consumer may submit a request to a support server to generate a QR code. In some embodiments, the request may exclude an amount for a transaction. In these and other embodiments, an API call may be sent from the consumer device to the support server to generate a QR code for the transaction. In these and other embodiments, the request may or may not identify the merchant where the consumer intends to engage in a QR code based transaction.

At block 610, a QR code may be transmitted to the consumer. For example, a QR code processing component of the support server may generate a QR code in response to the request and transmit the QR code to the consumer device.

The QR code may include information regarding the transaction, the merchant, the consumer device, etc.

At block 613, the merchant may scan the QR code. For example, the merchant may use an optical scanner of the merchant device to scan the QR code from the display of the merchant device. In these and other embodiments, the optical scanner may be part of a POS terminal for the merchant or other interface via which the consumer interacts with the merchant in making a purchase.

At block 615, a determination may be made by the merchant whether the scanned QR code is valid. For example, the merchant device may decrypt or otherwise obtain information from the QR code. If the QR code is not verified, the method 600 may proceed to the block 620. If the QR code is validated by the merchant, the method 600 may proceed to the block 625.

At block 620, an invalid message may be sent. For example, the merchant device may transmit a message to the consumer device that the QR code is not validated. As another example, the merchant device may report to the support server that the QR code is not validated and the support server may notify the consumer that the QR code is not validated.

At block 625, an amount of the payment may be received from the merchant device. For example, after validating the QR code, the merchant device may present the merchant with a user interface via which the merchant may input the amount of the transaction. As another example, the merchant device may automatically provide the amount (e.g., by subtotaling items scanned at a retailer) by transmitting the amount from the merchant device in response to validating the QR code.

At block 630, the amount for the payment may be sent to the consumer. For example, the support server may receive the payment amount from the merchant and send the amount on to the consumer for approval.

At block 635, a determination may be made whether the consumer confirms the amount for the transaction. The block 635 may be similar or comparable to the block 435 of FIG. 4. If the consumer does not confirm the amount, the method 600 may return to the block 620 and an invalid message may be sent to one or both of the parties to the transaction. If the consumer does confirm the amount, the method 600 may proceed to the block 640.

In these and other embodiments, the blocks 625 through 635 may include one or more SSL handshake exchanges between the merchant device and/or the consumer device such that the amount entered and verified may be securely handled. In these and other embodiments, such SSL handshakes may be facilitated by a pairing engine of the support server.

At block 640, approval of the amount from the consumer may be received at the support server. For example, in response to receiving an input confirming the amount from the consumer, the consumer device may transmit the approval to the support server indicating that the consumer approves of the amount of the payment for the transaction. In some embodiments, the approval of the amount may be transmitted in the form of an API requesting payment in the amount confirmed by the consumer.

At block 645, the payment may be processed. The block 645 may be similar or comparable to the block 335 of FIG. 3.

At block 650, a success message may be sent to the consumer. The block 650 may be similar or comparable to the block 345 of FIG. 3.

Figure 7:
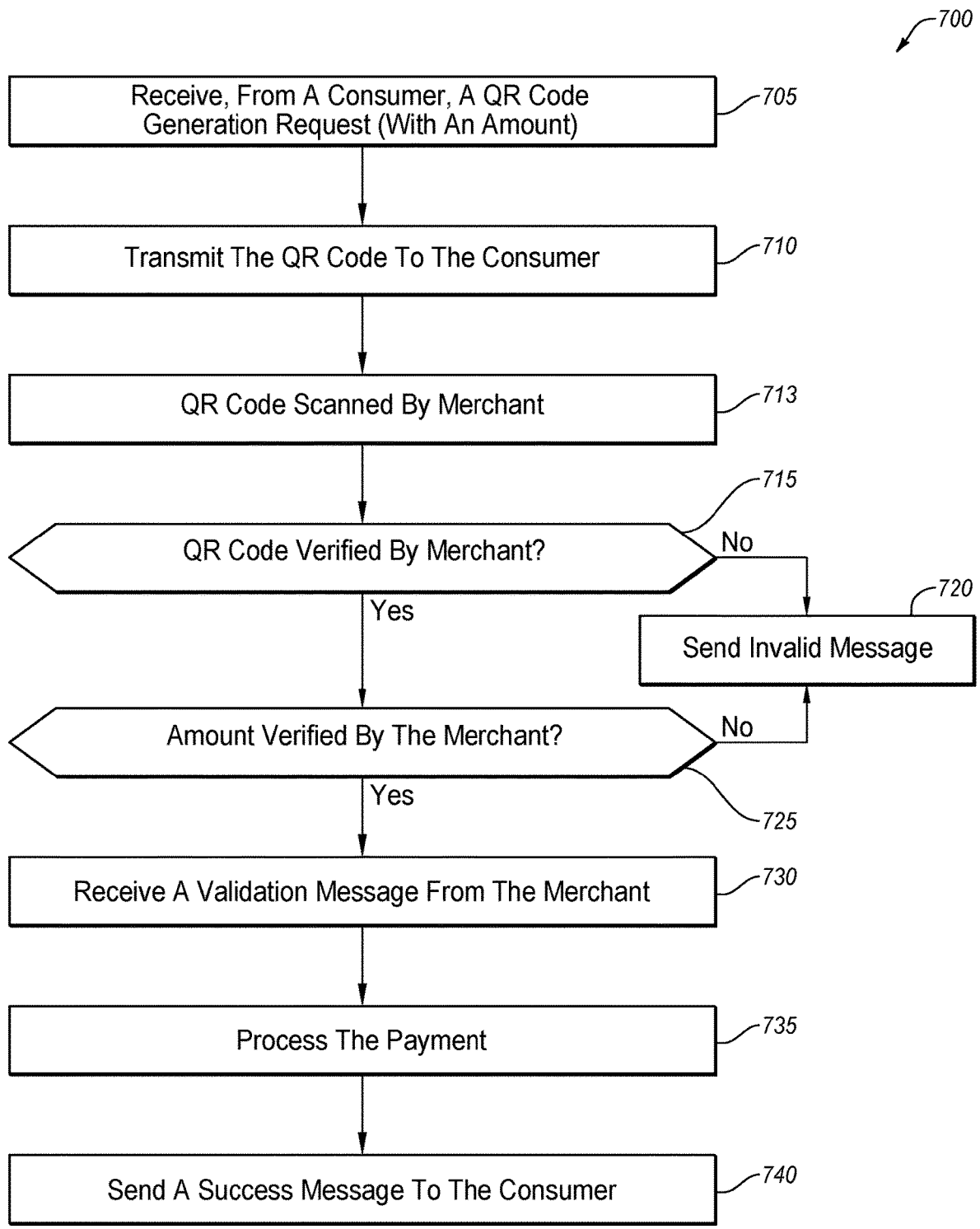
FIG. 7 is a flow diagram illustrating another example method of a QR code based data transfer.

FIG. 7 may illustrate one potential flow of a QR code based transaction. The flow of FIG. 7 may include a flow in which the payment characteristics include that the QR code is dynamic (e.g., generated fresh for each transaction), generated by the consumer, and scanned by the merchant. The QR code may include the amount of the transaction. The merchant may scan the QR code, and may approve the amount. Such a flow may include a high level of trust in the transaction as the consumer provides the amount and the merchant confirms the amount such that both parties have input into the transaction. Such a flow may utilize a low amount of network traffic, such that the flow may be utilized in locations with a limited network infrastructure. Such a flow may be particularly beneficial to larger merchants, or merchants with a robust computer infrastructure.

At block 705, a QR code generation request may be received from a consumer. In these and other embodiments, the QR code generation request may include the amount for the payment of the transaction. For example, a consumer may submit a request to a support server to generate a QR code. In these and other embodiments, an API call may be sent from the consumer device to the support server to generate a QR code for the transaction. In these and other embodiments, the request may or may not identify the merchant where the consumer intends to engage in a QR code based transaction. The API call may include the amount of the transaction.

At block 710, the requested QR code may be transmitted to the consumer. The block 710 may be similar or comparable to the block 610 of FIG. 6. After receiving the QR code, the consumer device may display the QR code such that the merchant device may scan the QR code.

At block 713, the merchant may scan the QR code. For example, the merchant may use an optical scanner of the merchant device to scan the QR code from the display of the merchant device. In these and other embodiments, the optical scanner may be part of a POS terminal for the merchant or other interface via which the consumer interacts with the merchant in making a purchase.

At block 715, a determination may be made whether the scanned QR code is verified by the merchant. The block 715 may be similar or comparable to the block 615 of FIG. 6. If the QR code is not verified, the method 700 may proceed to the block 720. If the QR code is validated by the merchant, the method 700 may proceed to the block 725.

At block 720, an invalid message may be sent. For example, the merchant device may transmit a message to the consumer device that the QR code is not validated. As another example, the merchant device may report to the support server that the QR code is not validated and the support server may notify the consumer that the QR code is not validated.

At block 725, a determination may be made whether the merchant verifies the amount identified in the QR code. For example, after scanning the QR code the merchant device may decrypt or otherwise extract information from the scan, including the amount of the payment for the transaction. The merchant may be presented with the amount on a user interface at the merchant device such that the merchant may verify the amount of the payment for the transaction. If the merchant does not verify the amount, the method 700 may return to the block 720 to send an invalid message (e.g., from the merchant device to the consumer device or from the merchant device to the support server to convey the invalid message to the consumer device). If the merchant verifies the amount, the method 700 may proceed to the block 730.

At block 730, a validation message may be sent from the merchant device to the support server. For example, the validation message may indicate that the QR code has been verified and that the amount in the QR code has been verified by the merchant. After receiving the validation message from the merchant device, both the consumer and the merchant may have had input into verifying the amount of the transaction and the payment may be ready to be processed.

In some embodiments, after receiving the validation message, details regarding the transaction may be stored by the support server. For example, the support server may store the QR code, the parties to the transaction, the amount of the transaction, the location of the transaction, a transaction identifier, etc., or other information regarding the transaction and/or the QR code.

At block 735, the payment may be processed. The block 735 may be similar or comparable to the block 335 of FIG. 3.

At block 740, a success message may be sent to the consumer. The block 740 may be similar or comparable to the block 345 of FIG. 3.

Figure 8:
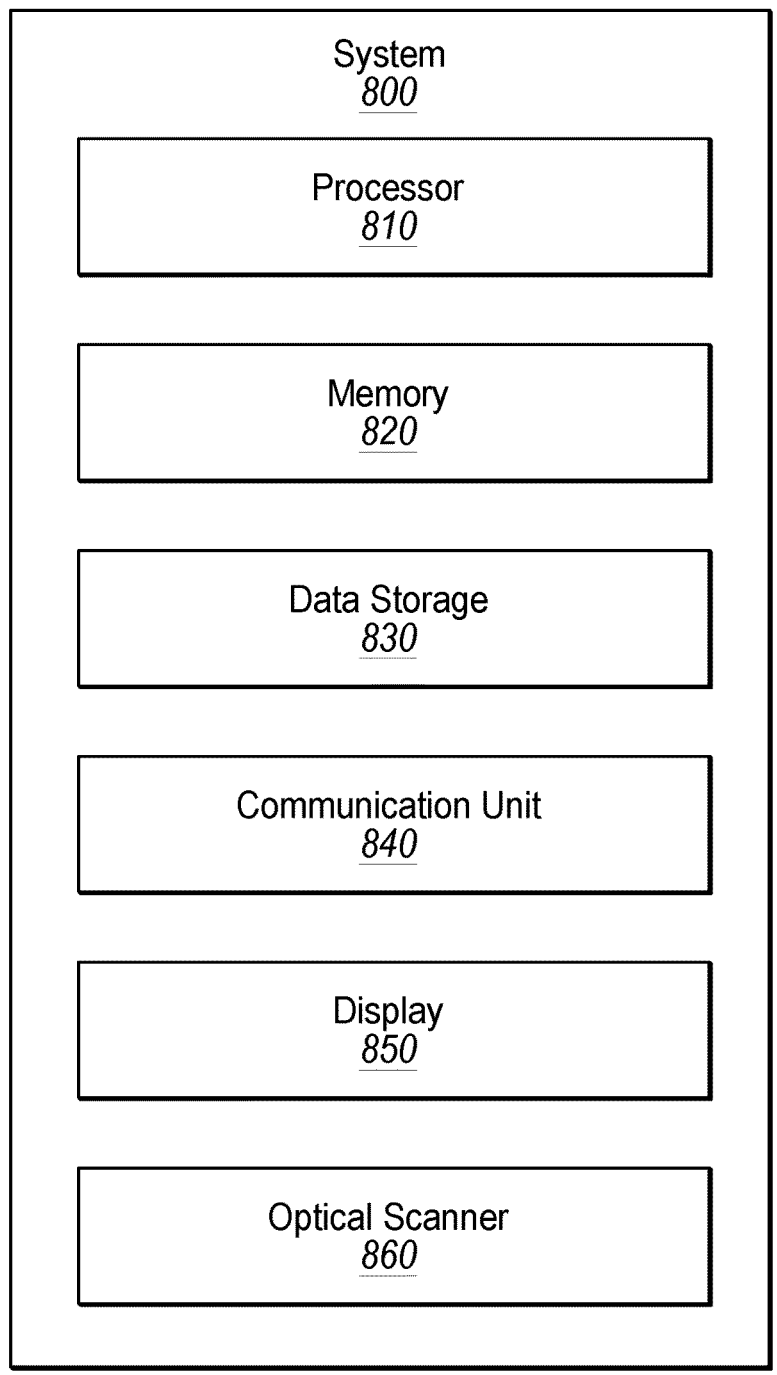
FIG. 8 illustrates an example computing system that may be used in a system configured to implement QR code based data transfers.

FIG. 8 illustrates an example computing system 800 ("system 800") that may be used in a system configured to implement QR code based transactions, in accordance with one or more embodiments of the present disclosure. The system 800 may include a processor 810, a memory 820, data storage 830, a communication unit 840, a display 850, and an optical scanner 860, which all may be communicatively coupled. In some embodiments, at least a portion of the system 800 may be part of any of the systems or devices described in this disclosure. For example, For example, the system 800 may be included in or part of the devices 110, 120, 130, and/or 140 of FIG. 1.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (SIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of networks or physical locations that are configured to perform individually or collectively any number of operations described herein. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions. In these and other embodiments, the QR code processing module 122, the payment processing module 124, and/or the location services module 126 may be stored in the memory 820 and/or the data storage 830 and may be loaded and executed by the processor 810 to perform operations with respect to facilitating a QR code based transaction.

The memory 820 and the data storage 830 may include computer-readable storage media or one or more computer-readable storage media for carrying or having computer-executable instructions or data structures stored thereon. Such computer-readable storage media may include any available media that may be accessed by a general-purpose or special-purpose computer, such as the processor 810. By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform or control performance of a certain operation or group of operations as describe in this disclosure.

The communication device 840 may include any component, device, system, or combination thereof that is configured to transmit or receive information over a network. In some embodiments, the communication device 840 may communicate with other devices at other locations, the same location, or even other components within the same system. For example, the communication device 840 may include a modem, a network card (wireless or wired), an infrared communication device, a wireless communication device (such as an antenna), and/or chipset (such as a Bluetooth device, near-field communication (NFC) device, an 802.6 device (e.g., Metropolitan Area Network (MAN)), a WiFi device, a WiMax device, cellular communication facilities, etc.), and/or the like. The communication device 840 may permit data to be exchanged with a network and/or any other suitable devices or systems, such as those described in the present disclosure. For example, when the system 800 is included in the devices 110, 120, 130, and/or 140 of FIG. 1, the communication device 840 may allow the devices 110, 120, 130, and/or 140 to communicate with one or more other devices over the network 150 of FIG. 1 and/or other communication avenues.

The display 850 may be configured as one or more displays, like an LCD, LED, or other type of display. The display 850 may be configured to present content such as video, text captions, user interfaces, and other data as directed by the processor 810. For example, when the system 800 is included in the devices 110, 120, 130, and/or 140 of FIG. 1, the display 850 may be configured to present QR codes.

The optical scanner 860 may include one or more devices configured to capture depictions, such as digital images or QR codes, infrared scans, and/or others. For example, the optical scanner 860 may include a camera (including a video, digital, or analog camera), an infrared scanner, a laser scanner, a charge-coupled device (CCD) sensor, a complementary metal-oxide-semiconductor (CMOS) sensor, or any other photosensor. The optical scanner 860 may be configured to capture a depiction of a QR code. In some embodiments, the optical scanner 860 may be configured to capture multiple depictions of the QR code (e.g., a video).

The system 800 may include or be included in a mobile device (such as a cellular telephone, e-reader, mobile gaming system, laptop, and/or others), a desktop computer, a server computer, an Internet connected device (e.g., a thermostat, security system, refrigerator, and/or others), wearable devices (e.g., a smart watch, smart glasses, fitness tracker, and/or others), or any other device.

One skill in the art, after reviewing this disclosure, may recognize that modifications, additions, or omissions may be made to the system 800 without departing from the scope of the present disclosure. For example, the system 800 may include more or fewer components than those explicitly illustrated and described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   receiving a quick response (QR) code from a computing device, wherein the QR code includes a QR code identifier, and wherein the QR code corresponds to a request to initiate an electronic transaction between a first entity and a second entity;
   determining a first set of characteristics associated with the electronic transaction and a second set of characteristics corresponding to the computing device, wherein determining the second set of characteristics includes:
  determining a geolocation of the computing device;
  transmitting, to the computing device, a network testing communication; and
  determining, based on a response to the network testing communication, properties of a network infrastructure in which the electronic transaction will occur;
identifying a first QR code processing flow from a plurality of QR code processing flows for the electronic transaction based on the first set of characteristics and the second set of characteristics;
verifying the QR code, wherein verifying the QR code includes determining, based on a first entity identifier included in the QR code identifier of the QR code, whether the identified first QR code processing flow is consistent with a QR code processing flow selected by the first entity prior to the request to initiate the electronic transaction being submitted; and
in response to verifying the QR code, processing the electronic transaction between the first entity and the second entity based on the first QR code processing flow.

2. The method of claim 1, further comprising:
  verifying the first entity based on the first entity identifier, wherein processing the electronic transaction is further performed based on verifying the first entity.

3. The method of claim 2, wherein the verifying the first entity is further based on verifying a location of the computing device.

4. The method of claim 1, wherein the first set of characteristics associated with the electronic transaction includes a transaction amount, an indication that the QR code processing flow selected for the electronic transaction utilizes pairing, and an indication of which of the first entity and the second entity will approve the electronic transaction, and wherein determining the first set of characteristics associated with the electronic transaction includes determining whether the QR code is a static QR code or a dynamic QR code.

5. The method of claim 1, wherein the first entity is a merchant and the second entity is a user conducting electronic interactions with the merchant.

6. The method of claim 1, wherein processing the electronic transaction between the first entity and the second entity includes:
  sending an amount of money specified by the second entity to the first entity; and
  receiving confirmation from the first entity indicating that the first entity received the money, and
  in response to receiving the confirmation from the first entity, sending a success message to the second entity indicating that the electronic transaction is complete.

7. A non-transitory computer-readable medium storing instructions which, in response to being executed, cause a machine to perform or control performance of one or more operations, the operations comprising:
  receiving a quick response (QR) code from a computing device, wherein the QR code includes a request to initiate an electronic transaction between a first entity and a second entity, and wherein the QR code includes a QR code identifier;
  determining a first set of characteristics associated with the electronic transaction;
  determining a second set of characteristics corresponding to the computing device, wherein determining the second set of characteristics includes:
    determining a geolocation of the computing device;
    transmitting, to the computing device, a network testing communication; and
    determining, based on a response to the network testing communication, properties of a network infrastructure in which the electronic transaction will occur;
  identifying a first QR code processing flow from a plurality of QR code processing flows for the electronic transaction based on the first set of characteristics and the second set of characteristics;
  verifying that the QR code is valid, wherein verifying the QR code includes determining, based on a first entity identifier included in the QR code identifier of the QR code, whether the identified first QR code processing flow is consistent with a QR code processing flow selected by the first entity prior to the request to initiate the electronic transaction being submitted; and
  in response to verifying that the QR code is valid, processing the electronic transaction between the first entity and the second entity according to the first QR code processing flow.

8. The non-transitory computer-readable medium of claim 7, wherein the first entity is a mobile merchant and the second entity is a consumer.

9. The non-transitory computer-readable medium of claim 8, wherein processing the electronic transaction is further performed in response to verifying the first entity based on the first entity identifier, and wherein the first set of characteristics associated with the electronic transaction includes a transaction amount.

10. The non-transitory computer-readable medium of claim 9, wherein the verifying the first entity is further based on verifying the geolocation of the computing device included in the second set of characteristics.

11. The non-transitory computer-readable medium of claim 7, wherein determining the first set of characteristics associated with the electronic transaction includes determining whether the QR code is a static QR code or a dynamic QR code.

12. The non-transitory computer-readable medium of claim 7, wherein processing the electronic transaction between the first entity and the second entity includes:
  sending an amount of money specified by the second entity to the first entity; and
  receiving confirmation from the first entity indicating that the first entity received the money.

13. The non-transitory computer-readable medium of claim 12, wherein processing the electronic transaction between the first entity and the second entity includes:
  in response to receiving the confirmation from the first entity, sending a success message to the second entity indicating that the electronic transaction is complete.

14. A system, comprising:
  one or more processors; and
  one or more non-transitory computer-readable media storing instructions which, in response to being executed by the one or more processors, cause the system to perform or control performance of one or more operations, the operations comprising:
    receiving a quick response (QR) code from a user computing device, wherein the QR code includes a QR code identifier, and wherein the QR code received from the user computing device is generated by the user computing device;

analyzing the QR code to determine that the QR code corresponds to a request to initiate an electronic transaction between a first entity and a second entity;

determining a first set of characteristics associated with the electronic transaction;

determining a second set of characteristics corresponding to the user computing device, wherein determining the second set of characteristics includes:

determining a geolocation of the user computing device;

transmitting, to the user computing device, a network testing communication; and determining, based on a response to the network testing communication, properties of a network infrastructure in which the electronic transaction will occur;

identifying a first QR code processing flow from a plurality of QR code processing flows for the electronic transaction based on the first set of characteristics and the second set of characteristics;

verifying the QR code, wherein verifying the QR code includes determining, based on an first entity identifier included in the QR code identifier of the QR code, whether the identified first QR code processing flow is consistent with a QR code processing flow selected by the first entity prior to the request to initiate the electronic transaction being submitted; and in response to verifying that the QR code is valid, processing the electronic transaction between the first entity and the second entity according to the first QR code processing flow.

15. The system of claim 14, wherein the first entity is a user and the second entity is a merchant corresponding to a brick-and-mortar store.

16. The system of claim 15, wherein the first set of characteristics associated with the electronic transaction includes a transaction amount.

17. The system of claim 15, wherein the verifying the first entity is further based on verifying the geolocation of the user computing device included in the second set of characteristics.

18. The system of claim 14, wherein processing the electronic transaction between the first entity and the second entity includes:

sending an amount of money specified by the second entity to the first entity;

receiving confirmation from the first entity indicating that the first entity received the money; and in response to receiving the confirmation from the first entity, sending a success message to the second entity indicating that the electronic transaction is complete.

19. The system of claim 14, wherein the determining the first set of characteristics associated with the electronic transaction includes determining that the QR code is a dynamic QR code that is unique to the electronic transaction.

20. The system of claim 14, wherein processing the electronic transaction is further performed in response to verifying the first entity based on the first entity identifier.

* * * * *